P. B. BOSWORTH.
QUICK DEMOUNTABLE BLOCK TIRE.
APPLICATION FILED FEB. 6, 1911.
1,043,061.
Patented Nov. 5, 1912.
2 SHEETS—SHEET 1.
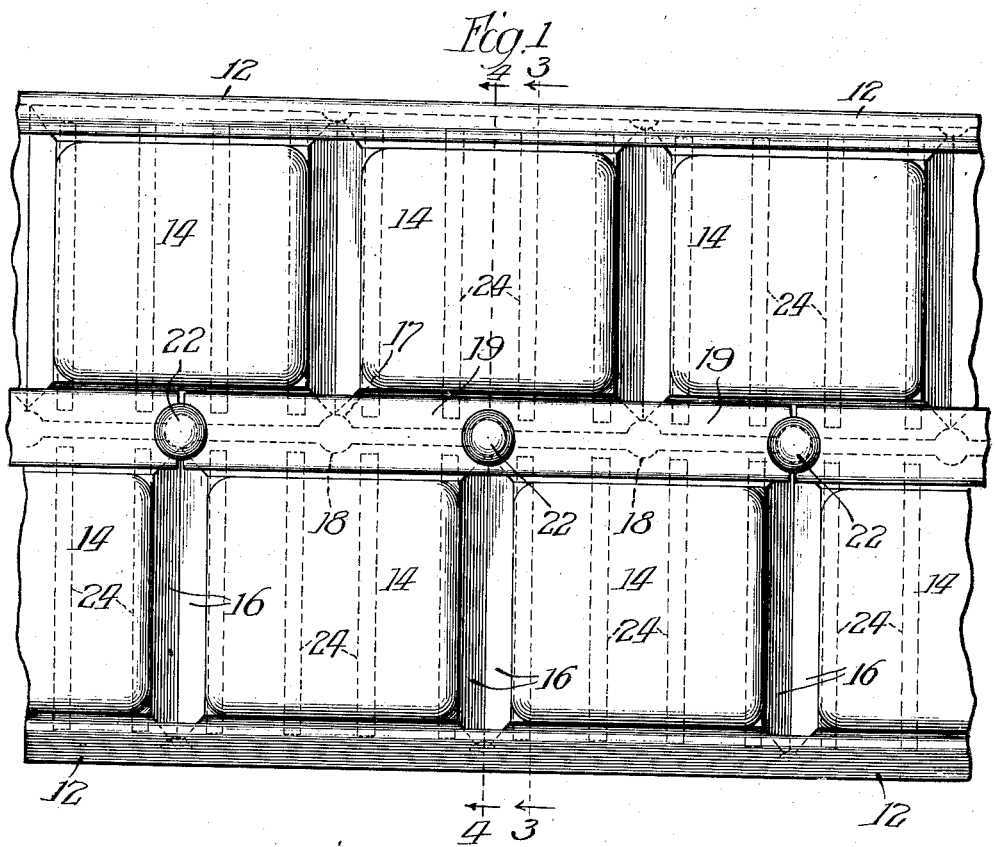
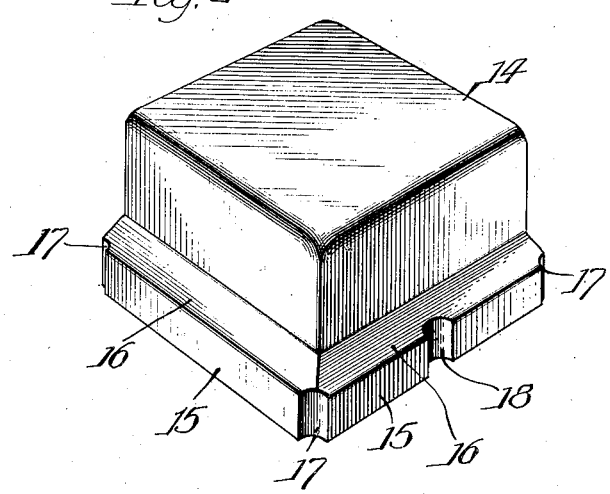
Witnesses:
Inventor
Percy B. Bosworth
By Smithson, Bolt & Fuller
Att'ys P. B. BOSWORTH.
QUICK DEMOUNTABLE BLOCK TIRE.
APPLICATION FILED FEB. 6, 1911.
1,043,061.
Patented Nov. 5, 1912.
2 SHEETS—SHEET 2.
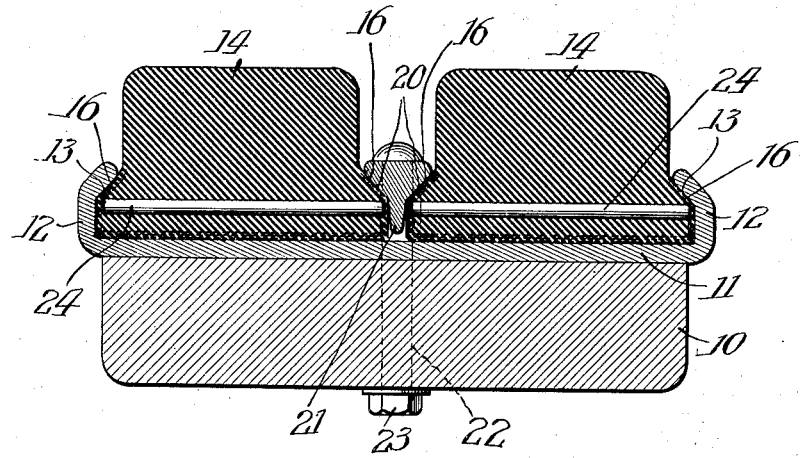
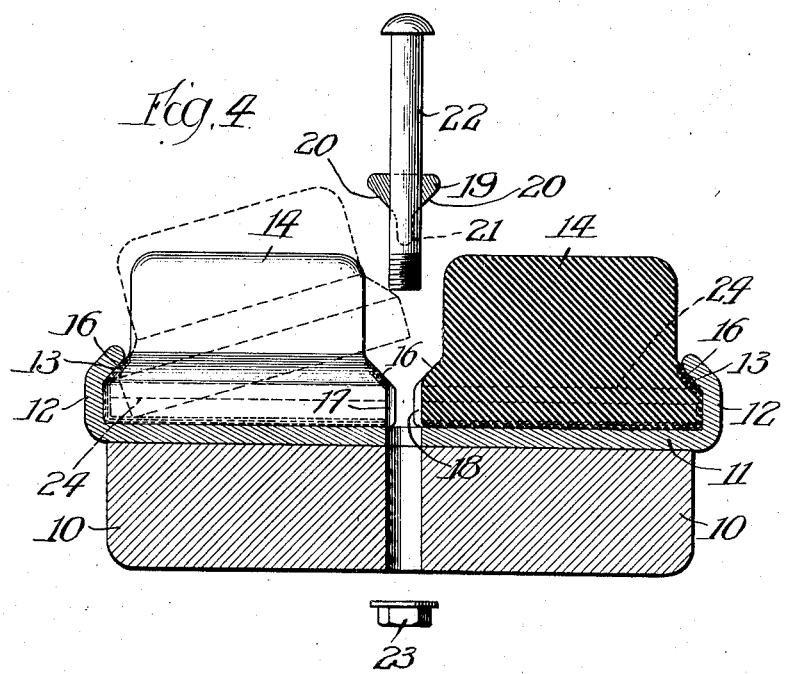

United States Patent Office.

PERCY B. BOSWORTH, OF AKRON, OHIO, ASSIGNOR TO THE FIRESTONE TIRE & RUBBER COMPANY, OF AKRON, OHIO, A CORPORATION OF OHIO.

QUICK-DEMOUNTABLE BLOCK-TIRE.

1,043,061.  Specification of Letters Patent.  Patented Nov. 5, 1912.

Application filed February 6, 1911. Serial No. 606,976.

*To all whom it may concern:*

Be it known that I, PERCY B. BOSWORTH, a citizen of the United States, residing at Akron, in the county of Summit and State of Ohio, have invented certain new and useful Improvements in Quick-Demountable Block-Tires, of which the following is a specification.

My invention relates to block tires, and refers particularly to quickly removable means by which the block tires may be retained on the felly rim of the wheel.

In automobile trucks and other vehicles of heavy construction it has become customary to use tires which are in the form of a plurality of blocks, these blocks often being placed in two or more rows on the vehicle wheel.

It is one of the objects of my invention to provide means by which these blocks may be securely held in position and by which, if it is desired to remove one or more of the blocks, the same may be accomplished without disturbing all of the blocks which are held on the felly rim.

The blocks which I use in my improved construction are made with projecting flanges located on the portions of the blocks lying next to the felly rim. The surfaces of these flanges, which are most distant from the center of the wheel, are preferably beveled. The felly rim is preferably constructed with outwardly extending flanges having beveled surfaces which engage the corresponding beveled surfaces on the flanges of the tire blocks. These blocks are ordinarily placed in two parallel rows on the felly rim. Between the two rows of blocks are placed a plurality of retaining members which have beveled surfaces engaging the beveled surfaces of the tire blocks, thereby forcing the blocks laterally against the rim flanges and holding them securely in position. Each of the retaining members engages only a small number (preferably two or three) of the tire blocks, so that if it is desired to replace any given block this result may be easily and quickly accomplished by first removing the bolts which hold the corresponding retaining member in position, then removing the retaining member itself, and finally removing the block which is to be replaced. These and other advantages of my invention will be more readily understood by reference to the accompanying drawings, which represent a preferred embodiment of my invention, and in which—

Figure 1 is a plan view of a portion of the periphery of a vehicle wheel, showing the tire blocks, the flanges of the felly rim and the retaining means in position; Fig. 2 is a perspective of one of the tire blocks; Fig. 3 is a transverse section on the line 3—3 of Fig. 1; and, Fig. 4 is a transverse section similar to Fig. 3 but taken on the line 4—4 of Fig. 1, and showing the method of removing one of the tire blocks.

The felly 10 is provided with a felly rim 11 having the flanges 12, 12, which on their outer ends are bent inwardly forming the beveled surfaces 13, 13. The tire blocks 14 have the flanges 15, with the beveled surfaces 16, and are also provided with grooves 17 on the corners where the flanges 15 meet. One of the flanges 15 is also provided with a groove 18, the object of which will be explained hereafter.

As clearly indicated in Figs. 1, 3 and 4, the tire blocks 14 are placed on the felly rim 11 preferably in two parallel rows, the beveled surfaces 16 of the flanges 15 engaging the beveled surfaces 13 of the flanges 12 of the felly rim 11. When the tire blocks 14 are placed in position they are preferably staggered, as shown in Fig. 1.

A plurality of retaining members 19, each of which has two beveled surfaces 20 and a wedge-shaped extension 21, are placed between the adjacent flanges 15 of the two rows of tire blocks, the beveled surfaces 20 of the retaining members 19 engaging the beveled surfaces 16 of the tire blocks 14. Each of the retaining members 19 is provided with a suitable aperture near its center and also with apertures at its ends. Through these apertures are passed the bolts 22, provided with nuts 23, thus securely holding the retaining members in position. These bolts also serve to securely hold the rim 11 on the felly 10. The apertures 17, 18 in the shouldered base portions accommodate the fastening bolts and permit the adjacent faces of the shoulders of the bases to be placed closely together, allowing only space for the vertical depending rib if used and they furthermore effect an intimate interlocking engagement of the fastening bolts, rim and blocks, thus tending to resist shocks and strains which might cause the blocks to shift in their positions, either turning around their axes, moving laterally or creeping around the wheel. When the nuts 23 are tightened, the retaining members 19 are drawn inwardly toward the center of the wheel, thereby securely holding the tire blocks 14 in position, and, by reason of the contact of the beveled surfaces 20 with the beveled surfaces 16, forcing the tire blocks laterally into contact with the flanges 12, 12 of the felly rim 11. The wedge-shaped extensions 21 of the retaining members 19 facilitate the placing of these retaining members in position and start the outward lateral movement of the tire blocks 14. In order to cause a more secure retention of the tire blocks in position, I preferably employ cross rods 24, extending laterally through the tire blocks and into the flanges 15. When it is desired to replace one of the said tire blocks, the bolts 22, which hold the retaining member 19, engaging said block, are first removed by previous removal of their nuts 23. The retaining member 19 is then withdrawn, and the block may be removed by swinging it outwardly into the position indicated by dotted lines in Fig. 4. A new tire block may then be placed in position and the various parts fastened together, as previously explained.

It will be apparent to those skilled in the art that many changes could be made in the detailed construction of the parts which I have described without departing from either the spirit or scope of my invention.

What I claim:

1. In combination with a vehicle wheel, a rim mounted thereon having marginal inturned flanges, a pair of rows of resilient tire blocks mounted on said rim, each of the blocks having shouldered base portions, the outer shoulders being adapted to engage beneath the inwardly turned rim flanges and the inner shoulders being provided with vertical marginal apertures, sectional retaining members disposed between the rows of blocks circumferentially of the wheel, and fastening bolts for the retaining members passing through the apertures and felly, whereby to interlock the blocks, rim and felly.

2. In the combination with a vehicle wheel, a rim mounted thereon having marginal inturned flanges, a pair of rows of resilient tire blocks mounted on said rim, each of the blocks having shouldered base portions, the outer shoulders being adapted to engage beneath the inwardly turned rim flanges and the inner shoulders being provided with recessed portions, and securing means for the blocks comprising sectional members disposed between the rows of blocks circumferentially of the wheel and fastening devices for securing the sectional members against movement circumferentially of the felly, portions of the securing means interlocking with the recessed portions of the inner shoulders to lock the blocks against turning or creeping relative to the rim.

PERCY B. BOSWORTH.

Witnesses:
E. M. HAHN,
S. G. CARKHUFF.